United States Patent
Luton, Jr.

[15] 3,702,453
[45] Nov. 7, 1972

[54] TEMPERATURE-COMPENSATED TRIMMING WINDINGS FOR WATER-COOLED MAGNET COILS

[72] Inventor: James N. Luton, Jr., Oak Ridge, Tenn.

[73] Assignee: The United States of America as represented by the United States Atomic Energy Commission

[22] Filed: July 19, 1971

[21] Appl. No.: 163,680

[52] U.S. Cl. ................................336/62, 336/195
[51] Int. Cl. ........................H01f 27/10, H01f 27/28
[58] Field of Search......336/55, 58, 60, 62, 195, 179; 174/15 R

[56] References Cited

UNITED STATES PATENTS 3,005,965  10/1961  Wertanen ...............336/195 X
3,213,929  10/1965  Marshall et al.......174/15 R X
1,995,301  3/1935   Gebhard.......................336/62
2,879,366  3/1959   Tudbury..................336/62 X
3,453,574  7/1969   De Parry................336/195 X Primary Examiner—Thomas J. Kozma
Attorney—Roland A. Anderson

[57] ABSTRACT

A technique is disclosed for accurately adjusting the field shape of a high power density magnet system. The method uses to advantage the hollow tubular conductors that comprise the windings of the main coil. The trimming winding consists of an insulated wire (or wires) pulled through the hollow conductor (or conductors) whose relative field strength is to be altered. The amplitude and polarity of current in the wire is chosen to provide the desired field shape.

5 Claims, 2 Drawing Figures

PATENTED NOV 7 1972

3,702,453

INVENTOR.
James N. Luton, Jr.

BY

ATTORNEY.

TEMPERATURE-COMPENSATED TRIMMING WINDINGS FOR WATER-COOLED MAGNET COILS

BACKGROUND OF THE INVENTION

This invention was made in the course of, or under, a contract with the United States Atomic Energy Commission.

An ideal trimming winding for any magnet system must produce a field which exactly follows the main field over the whole range of the coil current and which drifts with the main field as external conditions vary.

Two prior art methods of field adjustment are: (1) use of separate compensation windings, and (2) changing the current distribution in the coil by means of auxiliary power supplies or external shunts. Both methods have significant disadvantages when used with coils producing high magnetic fields. If separate trimming windings are employed, then either they must be placed inside the bore, where they encroach on the useful field volume, or else the bulk of the main coil windings and their terminations force the location of the compensation (trimming) windings to be far from the coil center. This reduces their effectiveness for producing local changes in the field shape.

When employing the method of changing the current distribution in the coil with power supplies, a separate supply is required for each section whose current is to be altered. Each of these regulated power supplies must provide considerable power and must track and drift with the main generator. If external shunts are used instead of power supplies, the ratio of their resistance to that of the coil must remain constant as the coil current is varied. Furthermore, the shunt resistance must vary with time in the same way that the coil resistance does, both over short and long periods of time. Finally, an external shunt can only decrease the current in the affected coil turns, not increase it.

Thus, there exists a need for some means and/or method of providing trimming windings for a magnet system such as to overcome the disadvantages of the prior art methods, discussed above. The present invention was conceived to meet this need in a manner to be discussed hereinbelow.

SUMMARY OF THE INVENTION

It is the object of the present invention to provide trimming windings for a high power density magnet system wherein the trimming windings require substantially less operating current capacity, they do not encroach on the bore volume of the magnet system, and they provide precise and accurate adjustment of the system field shape.

The above object has been accomplished in the present invention by utilizing an insulated wire which comprises the trimming winding and positioning such a winding within the hollow conductor (or conductors) of the magnet system in which the trimming winding will be used. The insulated trimming wire is pulled through the hollow conductor until it extends completely through the hollow conductor in a manner to be described hereinbelow. The amplitude and polarity of current in the trimming wire are chosen to give the desired resultant fields of the magnet system.

DESCRIPTION OF THE PREFERRED EMBODIMENT

Figure 1:
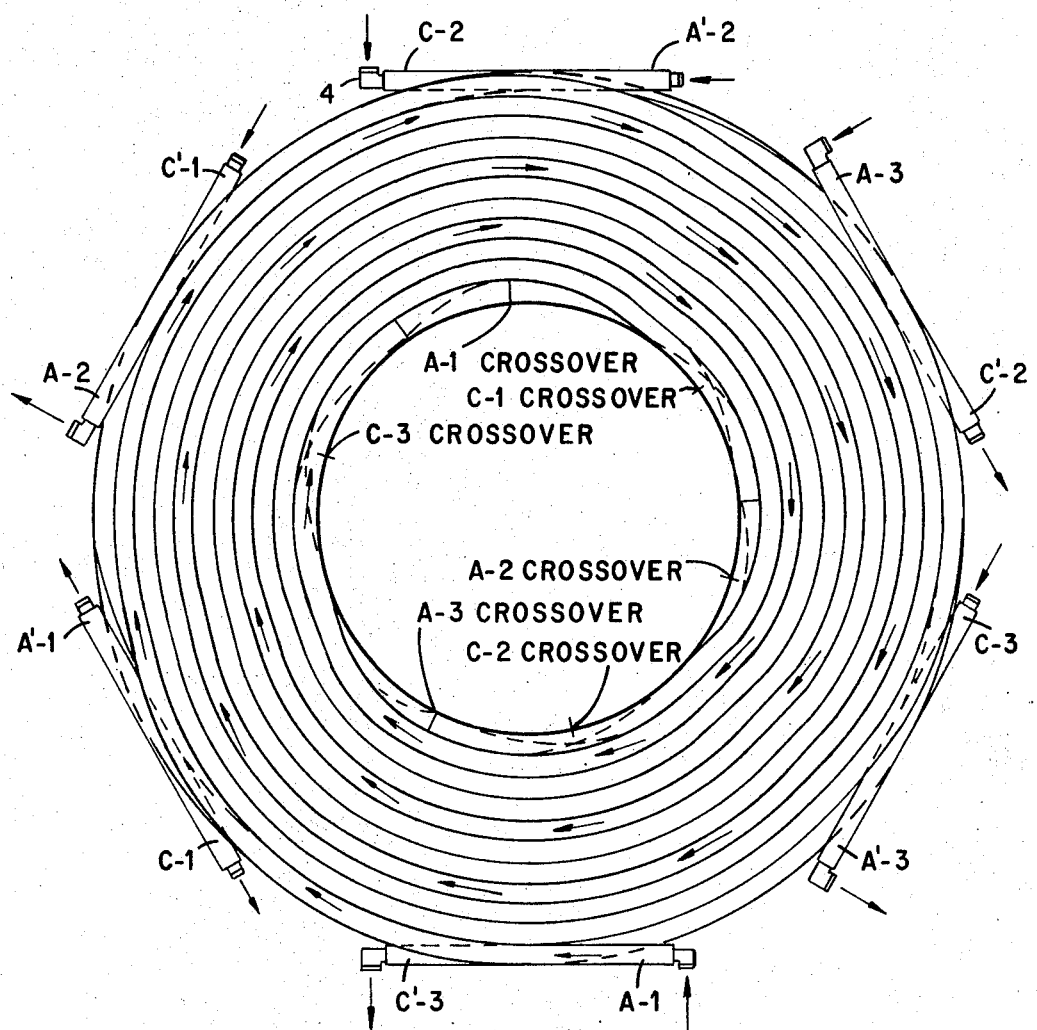
FIG. 1 is a schematic illustration of one magnet system in which the present invention may be utilized.

FIG. 1 illustrates one example of a high power density magnet system in which the present invention may be utilized. The system of FIG. 1 is a pancake wound magnet provided with a plurality of hollow, fluid-cooled, insulated conductors comprising three layers with the conductors arranged in a spiral configuration and provided with appropriate crossovers at the bore of the device such that the end connections of all fluid paths are at the outer cylindrical surface of the coil, leaving the bore and both ends unobstructed. The system of FIG. 1 is similar to other pancakes which are stacked concentrically and bolted together to form a composite coil which has been used and is presently being used to provide a high density magnetic field (about 60 K gauss) in various experimental devices investigating the feasibility of providing controlled thermonuclear reactions.

Prior to the present invention, there was utilized one of the prior art methods, discussed hereinabove, to effect a desired magnetic field adjustment to any given magnet system.

Referring specifically to FIG. 1, a hollow conductor A–1 spirals into the A–1 crossover point where it crosses over to an underneath layer and spirals out as the hollow conductor A'–1. Likewise, hollow conductor A–2 spirals into the A–2 crossover point and then spirals back out as the hollow conductor A'–2. Also, hollow conductor A–3 spirals into the A–3 crossover point and then spirals back out as the hollow conductor A'–3.

In a like manner, hollow conductors C–1 and C'–1, C–2 and C'–2 and C–3 and C'–3 spiral into their respective crossover points and then out from layers underneath the layer containing the A–1, A–2, and A–3 conductors. The lined arrows indicate the direction of cooling fluid flow through each of the six paths. It should be noted that the cooling fluid may be air or water, for example. In addition, the fluid flow path through the conductor A–1 is shown by the lined arrows to more clearly show the conductor A–1's physical relationship to the conductors A–2 and A–3. The hollow conductors of FIG. 1 are electrically connected in series with the operating current from a power supply, not shown, starting with conductor A–1 and ending with conductor C'–3 which could either serve as a coil terminal or be connected to the next pancake when a plurality of such pancakes are bolted together to form a composite coil assembly.

Figure 2:
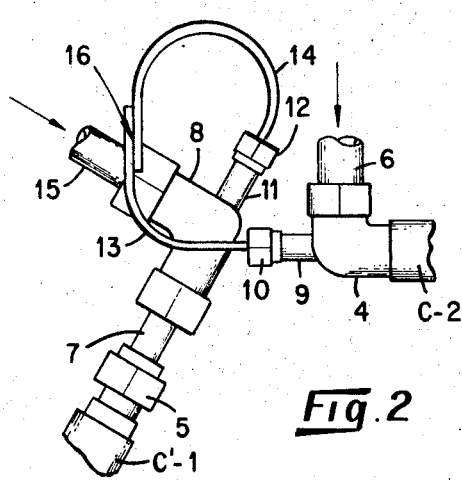
FIG. 2 is a schematic illustration of how the trimming windings are associated with the hollow conductors of the system of FIG. 1.

The manner in which the insulated wires forming the trimming windings for the coil assembly of FIG. 1 are fed through the desired hollow conductors will now be described. FIG. 2 illustrates how two of the trimming winding wires are associated with two of the hollow conductors of FIG. 1, namely, conductors C'–1 and C–2. In FIG. 2, the elbow fitting 4 connected to the hollow conductor C-2 and to the fluid cooling line 6 is provided with a threaded tubular fitting 9 through which an insulated trimming wire 13 passes. The wire 13 then extends through fitting 4, hollow conductor C-2, through hollow conductor C'-2 (FIG. 1), and then exits from the conductor C'-2 in the same manner that it enters the conductor C-2. The fitting 10, affixed to the tubular fitting 9, is provided with an internal O-ring seal encompassing the wire 13 to prevent cooling fluid from the line 6 from exiting through the fitting 9.

In a similar manner, an insulated trimming wire 14 passes through a fitting 12, a fitting 11, an elbow fitting 8, a tube 7, a coupling 5, the hollow conductor C'-1, and then completely through the hollow conductor C-1 (FIG. 1). A cooling fluid line 15 is coupled to the elbow fitting 8 to supply cooling fluid to the conductors C'-1 and C-1.

It should be understood that a third insulated trimming wire, not shown, is passed through the hollow conductors C-3 and C'-3 (FIG. 1) in the same manner as the wires 13 and 14 are passed through their respective conductors. The wires 13 and 14 of FIG. 2 may be connected together electrically by means of a demountable joint 16, for example. In a like manner, the wire 13 extending out of conductor C'-2 and the above-mentioned third wire extending out of conductor C-3, not shown, may be electrically connected together.

The trimming wire 14 extending out from conductor C-1, not shown, and the above-mentioned third trimming wire extending out from conductor C'-3, not shown, may serve as trimming wire coil terminals, one or both of which may be connected to a trimming winding terminal of an adjacent pancake coil. It should be understood that the number of hollow conductors within which the trimming wires are placed is not necessarily limited to three, as described above, but may be more or less than three depending upon the requirements of the magnet system in which the trimming wires are to be utilized. The power for the trimming wires may be tapped off from the main magnet terminals, from a section of the coil wherein the ampere turns are to be reduced or from a separate source of supply, as desired.

The trimming winding wire is installed in a hollow conductor in the following manner. First, a small stranded wire with teflon insulation is fed through an O-ring seal mounted in the end of a hollow conductor and the wire is installed in the hollow conductor with the aid of normal fluid flow therethrough. With the help of the first wire and the fluid flow, a 16-gauge wire can then be pulled through, and finally, with the aid of the larger wire and the fluid flow, a solid 12-gauge wire can be pulled through the hollow conductor. For undamaged wires, the leakage resistance was found to be always above $10^5$ ohms. The presence of the wire in the hollow conductor reduced the fluid flow through the tube by less than 10 percent. It should be understood that the size of the final trimming wire or wires to be utilized depends upon the requirements of the particular magnet system in which they are to be employed. The insulation encompassing the trimming windings may be polyvinyl formal, polyamide-imide, or polyesteramideimide, for example.

Each of the hollow conductors and its trimming wire are preferably composed of metals with the same temperature coefficient of resistance and are both cooled by the fluid flowing inside the hollow conductor. Since the hollow conductors are usually copper, copper trimming windings would be used. Therefore, even though fluctuations in fluid inlet temperature or flow velocity change the temperatures all down the length of the hollow conductor, the temperatures of the wire and conductor tend to remain equal at any cross section, especially if the wire insulation is thin. In this case, the ratio of the current in the coil to that in the trimming wire turns, and therefore the resulting field shape, is inherently immune to any external changes in coolant pressure, or temperature, or in electric current. In addition, in hollow conductors of the customary lengths, the temperature difference within individual cross sections will be small and will result in negligible differences in absolute temperatures and electrical resistivities.

In the case of a single fluid path whose current is to be reduced by an internal trimming winding, the wire and hollow conductor have equal lengths and their terminal voltages are identical. Their current densities, therefore, are also identical and the trimming current ratio $(I_{wire})/(I_{conductor})$ is fixed by the choice of wire size. An equivalent size between any two standard sizes can be achieved by butt brazing or welding the standard wires together and positioning the splice the proper distance from one end of the hollow conductor. If the wire ends are allowed to extend beyond the electrical connectors, then the resistance of the trimming winding can be adjusted in service by removing the connectors and sliding the wire one way or the other in the hollow conductor. If the coil section whose field is to be trimmed is larger than one fluid path, then the desired current ratio might be achieved more easily by simply using different standard wire sizes in the various fluid paths and connecting the wires in series. If it is desired to reduce the current density in some sections of the coil and increase it in others, internal windings fed from the former sections may be placed within the latter sections and connected with aiding polarity.

It should be understood that the present invention is not limited to the specific magnet system described hereinabove, but may equally be utilized to provide internal trimming wires in all other high power density magnet systems in which cooled hollow conductors are employed to provide the main magnetic field.

The use of internal trimming wires, as discussed hereinabove, has several advantages over other types of current trimming: they do not require separate current control as they are always at the temperature of the hollow conductors in which they reside and from which they are normally energized; they require only half the current capacity of an external shunt or power supply producing the same field reduction; they do not encroach on the bore volume, yet are close enough to produce local changes in the field; and wires fed from coil sections where the current density is to be reduced may be placed (with aiding polarity) in other sections where the current density is to be increased.

This invention has been described by way of illustration rather than limitation and it should be apparent that it is equally applicable in fields other than those described.

What is claimed is:

1. In a magnet coil system including a plurality of insulated internally cooled hollow conductors, said hollow conductors having means connected to a power supply source to provide a desired magnetic field shape, the improvement comprising means for adjusting said magnetic field shape, said last-named means comprising an insulated trimming wire positioned within each of a selected number of said hollow conductors and extending completely therethrough, each of said trimming wires having means connected with respective desired polarities either to the power supply source, to selected sections of said magnet coil system, or to a separate power supply source or sources to provide a desired change or adjustment in the magnetic field of said system, said hollow conductors being arranged in a concentric relationship and spiraling in to a central bore area in at least one layer, crossing over, and then spiraling out from the bore area in another layer to the periphery of said layers to form a pancake shaped magnet.

2. The magnet system set forth in claim 1, wherein the number of said hollow conductors is at least six, and the number of said layers is at least three.

3. The magnet system set forth in claim 1, wherein the number of said hollow conductors is at least two, and the number of said layers is at least two.

4. The magnet system set forth in claim 3, wherein said hollow conductors and said trimming wires are copper.

5. The magnet system set forth in claim 4, wherein each of said insulated trimming wires is a solid 12-gauge wire.

* * * * *